United States Patent [19]
Rothstein

[11] Patent Number: 4,625,165
[45] Date of Patent: Nov. 25, 1986

[54] TUBE INSPECTION PROBE WITH ROTATING EDDY CURRENT COIL

[76] Inventor: Samuel Rothstein, 79-19 269th St., New Hyde Park, N.Y. 11040

[21] Appl. No.: 558,955

[22] Filed: Dec. 7, 1983

Related U.S. Application Data

[63] Continuation-in-part of Ser. No. 306,175, Sep. 28, 1981, abandoned.

[51] Int. Cl.⁴ .................... G01N 27/90; G01R 33/12
[52] U.S. Cl. ...................................... 324/220; 33/302
[58] Field of Search ................................ 324/219–221; 33/178 E, 178 F, 302; 73/623

[56] References Cited

U.S. PATENT DOCUMENTS

| | | | |
|---|---|---|---|
| 2,684,464 | 7/1954 | Hastings et al. | 324/220 |
| 3,035,353 | 5/1962 | Hovemeyer et al. | 324/219 X |
| 3,088,068 | 4/1963 | Hall et al. | 324/221 |
| 3,163,487 | 12/1964 | Buck | 324/221 X |
| 3,238,448 | 3/1966 | Wood et al. | 324/220 |
| 3,267,366 | 8/1966 | Bricaud | 324/221 |
| 3,419,797 | 12/1968 | Libby | 324/220 |
| 4,087,748 | 5/1978 | Pigeon et al. | 324/220 |
| 4,134,067 | 1/1979 | Woodbury | 324/219 |
| 4,182,985 | 1/1980 | DeWolfe et al. | 324/220 |
| 4,341,113 | 7/1982 | Gutzwiller | 324/220 X |
| 4,441,078 | 4/1984 | LeComte | 324/219 |

FOREIGN PATENT DOCUMENTS 643794  1/1979  U.S.S.R. ............................ 324/219

Primary Examiner—Gerard R. Strecker
Attorney, Agent, or Firm—Brooks Haidt Haffner & Delahunty

[57] ABSTRACT

An electro-mechanical eddy current probe having a rotatable sensing head for sensing the wall thickness of and locating local defects in a tube or conduit through which it is passed. The rotatable head includes a radially movable, outward projecting sensing member which is spring-biased into engagement with the interior surface of the tube and which carries an eddy current coil electrically monitored by the probe. The cylindrical probe is centered within the tube by a pair of centering guides at either of its ends. The probe also carries a fixed eddy current coil on its non-rotating body portion for detecting and anticipating locations of particular interest within the tube where the longitudinal movement of the probe should be slowed, such as locations of exterior tube support plates where denting is more apt to occur.

10 Claims, 5 Drawing Figures

U.S. Patent  Nov. 25, 1986  Sheet 1 of 2  4,625,165
FIG. 1.
FIG. 2.
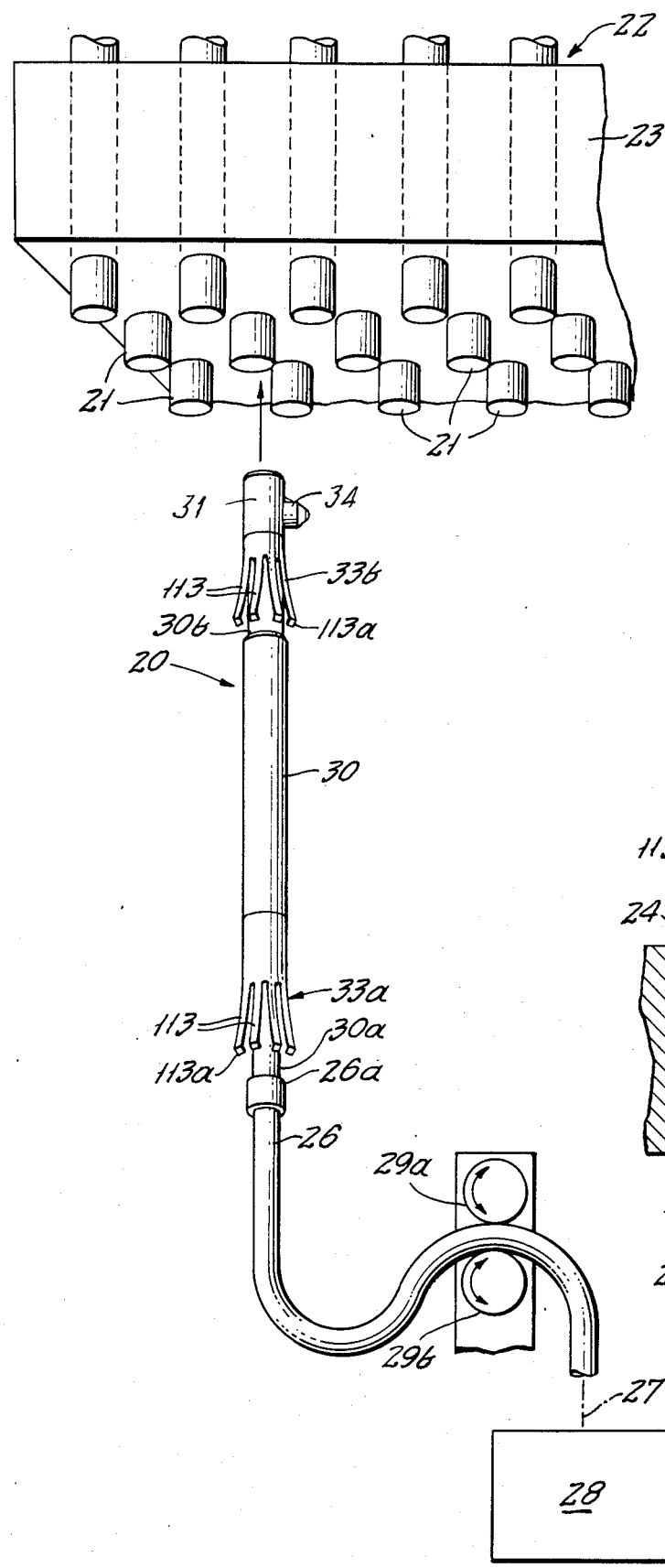
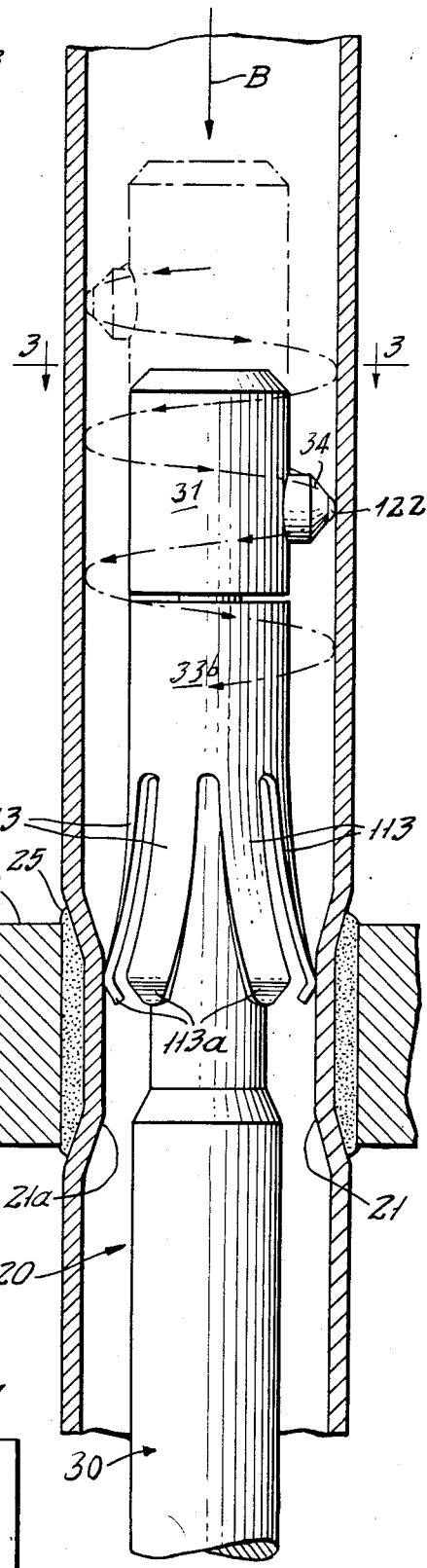

TUBE INSPECTION PROBE WITH ROTATING EDDY CURRENT COIL

This application is a continuation-in-part of copending application Ser. No. 306,175, filed Sept. 28, 1981 and now abandoned.

FIELD OF THE INVENTION

This invention relates to profilometry techniques and, more particularly, to electro-mechanical eddy current probes for insertion into tubes or the like to sense changes and defects in the tube wall even though their interior shapes may not be regularly cylindrical.

Although the invention was made during a study towards improving techniques used for examining the interiors of steam generator tubes and will therefore be described in connection with such use, it will be understood that the invention may have other uses, such as for examining the interiors of larger or smaller tubes or tubular members, or the interiors of gas service lines or other types of conduits.

BACKGROUND OF THE INVENTION AND THE PRIOR ART

As described in said application Ser. No. 306,175 those familiar with the operation and maintenance of steam generators understand that, during system downtime, the tubes of the steam generator must be inspected, and defective tubes plugged or repaired. It is also known that steam generator tubes may be preventively plugged, in advance of leaks actually occurring therein, if an examination of the interior of the tube indicates the presence of high strain or tube wall defect which, in turn, indicates possible incipient breakage. It is therefore an object of the present invention to provide a more effective means of examining tube interiors to detect the presence or not of such strain or defect which, in turn, will indicate the likelihood or not for tube breakage during reactivated use of the tube.

Distortion of the tube interior shape, commonly called "denting", is known to be a result of non-uniform strain in the metal of which the tube is made. High strain makes the tube susceptible to stress corrosion cracking which in its early state is impossible to detect by usual eddy current examination means because the "dented" distortion of the tube produces an over-riding eddy current signal. Determination of such cracking or other defect by more accurate eddy current examination of a distorted tube by which predictions regarding tube cracking can be improved is an important object of this invention. Thus, it is intended by the present invention to provide an interior probe for tubes, such as steam generator tubes, for more accurately sensing tube wall defects in distorted or "dented" tubes.

For example, especially in modern pressurized water reactor steam generators, "denting" occurs during operation by reason of an accumulation of corrosion products between the tube support plates and the tubes themselves. This distortion results in strain which, if high enough, makes the tube susceptible to stress corrosion cracking. In the past, eddy current inspection techniques have been used to evaluate the size of these "dents". Such non-destructive examination of steam generator tubes has been developed from previously known eddy current techniques for detecting defects in the tubing, such as existing cracks and the like, and the interpretation of eddy current signals indicating the existence of denting is based on a comparison with known signals from standards. Although denting can thus be quantified, eddy current measurements for this purpose have been found to be generally incorrect because, at best, they measure only the average tube diameter at any given location within the length of the tube. The eddy current signal resulting from even a small dent is large in comparison to the signal resulting from a small crack, so that the latter signal is not apparent in the presence of the former. Accordingly, tube leaks have not been accurately predicted using eddy current measurements.

BRIEF DESCRIPTION OF THE INVENTION

Briefly and generally describing the present invention, it provides an eddy current probe having a motor-driven rotatable head mounted thereon for rotation about the longitudinal axis of the probe. The rotatable head carries a transverse, outwardly projecting and radially movable sensing member which is biased in the outward direction and rotates in contact with the interior wall surface as the probe unit is moved longitudinally through the tube being examined. As described in said application Ser. No. 306,175, the sensing member is thus slidable, both inwardly and outwardly, and the tube surface is continually sensed, in a spiral line pattern, in terms of the changes in interior radius of the tube as measured from the centerline of the probe.

In accordance with this invention, the radially movable sensing member carries an eddy current coil near its tip so that the coil is always at a fixed distance from the interior wall surface of the tube when the probe is passing longitudinally therethrough. Changes in wall thickness, or a local defect at dent locations or elsewhere along the tube wall cause changes of current flow through the coil, which are detected and recorded, and from which the comparative degrees of the loss in wall thickness and thus the wall thickness, or a local defect in the tube can be ascertained.

The rotating head is motorized by an electric gear motor mounted within the main body of the probe, and rotates continuously at a steady rate. As discussed in copending application Ser. No. 306,175, any radial movement of the sensing member causes a change in electrical state within the probe, and thus a steady flow of tube-surface data is also collected, from which the complete tube profile can be plotted. In this application of the probe, radial measurements are not monitored as they are in several of the embodiments described in said application Ser. No. 306,175, but the eddy current response is monitored by electric sensing apparatus, and either recorded or fed directly into a computer for use in determining the presence, if any, of tube wall defects and their magnitude.

As described in said application Ser. No. 306,175 the eddy current probe is mounted on the end of a stiff but flexible hollow plastic cable tubing, which contains the electric lead wires to the probe, and by which it is pushed and pulled through the tube whose profile is to be determined. For a more controllable and uniform rate of movement, the simultaneous readings from the rotating sensing head and the non-rotating eddy current coil are taken only as the probe is pulled from the opposite end of the tube back towards the open end into which it was inserted and initially pushed to the far end of the tube, by feeding the flexible cable tubing into the tube. A motorized pulling system is used to withdraw the cable tubing and, thus, the probe moves longitudinally at a steady rate, which is slowed, or the probe is stopped, as the probe passes or reaches tube regions of possibly greater interest in order to obtain more closely spaced readings from the rotating head, which rotates at a constant rate. Electric wires within the flexible cable connect the sensing apparatus either to a strip chart recorder or directly into a computer. Of course, if the rotating, radially moving eddy current sensor device indicates changes in tube wall thickness, the tube is preventively plugged if the wall thickness at any location is found to be less than acceptable.

DETAILED DESCRIPTION OF PREFERRED EMBODIMENTS

These and other objects, features and advantages of the invention will be apparent from the following detailed description of presently preferred embodiments thereof, which should be read with reference to the accompanying drawings in which:

FIG. 1 is a fragmentary perspective view of one end of a vertical steam generator tube bundle, illustrating an inspection probe in accordance with the present invention just prior to its introduction into one of the tubes in the bundle;

FIG. 2 is an enlarged and fragmentary sectional view of a tube at a tube support plate location, and having a probe in accordance with the present invention within the tube;

Figure 4:
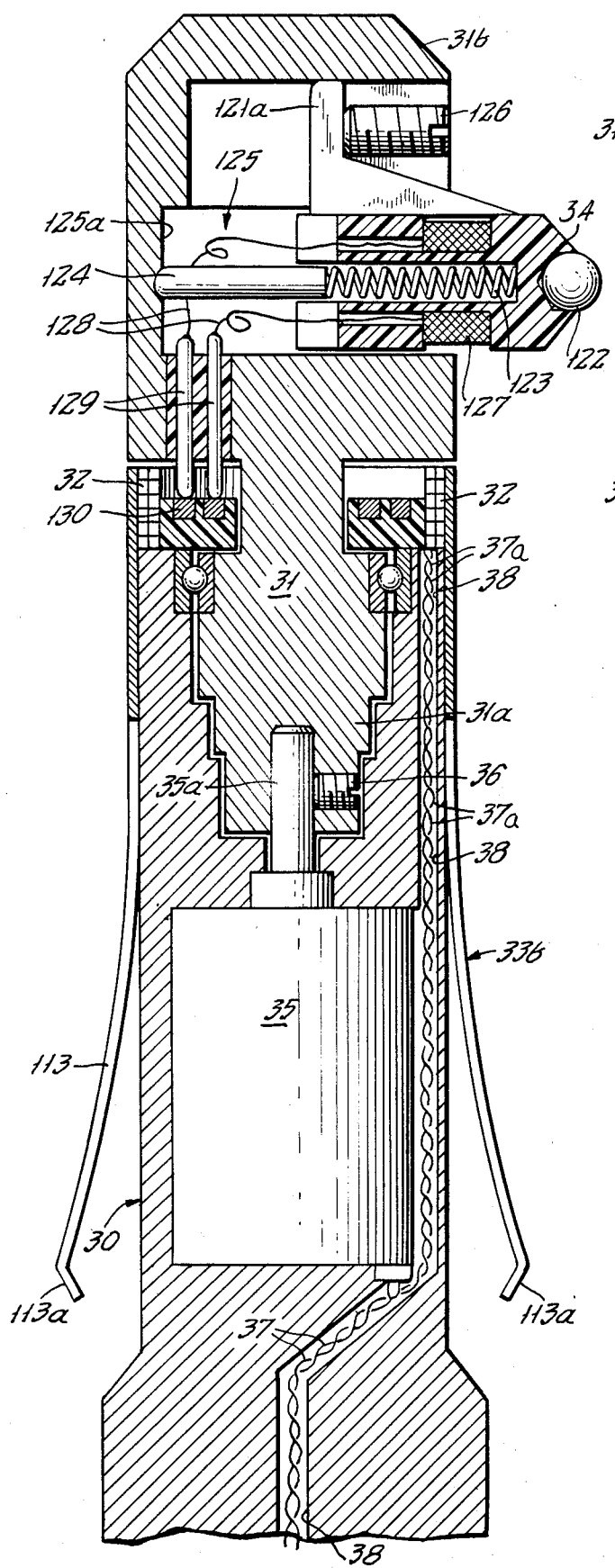
FIG. 4 is a further enlarged and fragmentary side-sectional view illustrating details of the inspection probe generally illustrated in FIGS. 1-3.

Referring to FIGS. 1 and 2, which correspond to FIGS. 1 and 2 of said application Ser. No. 306,175 a rotating head eddy current probe according to the present invention is generally indicated by reference numeral 20, and is shown prior to its insertion into any tube 21 of a tube bundle 22, such as in a vertically arranged steam generator, for the purpose of tracing the interior profile of the tube. Although not illustrated, the steam generator in which the tube bundle 22 is disposed may be a conventional vertical shell and U-tube heat exchanger of the type used in the nuclear power industry as part of a pressurized water reactor (PWR) plant which produces steam to drive electric power producing equipment (not shown). Typical steam generators of this type have more than 3,000 tubes 21, made of Inconel metal and mounted in bundle-like fashion extending upwardly from a steel tube plate 23 to a U-shaped bend at the top, and thence back to the tube plate 23. The tubes are maintained in fixed, spaced apart relation to adjacent tubes throughout their lengths by usually six or seven longitudinally spaced-apart steel tube supports, only one of which is indicated by reference numeral 24 in FIG. 2. As is well-known, high temperature, high pressure water (primary water) is circulated through the U-tubes 21, and relatively low temperature low pressure water (secondary water) is introduced into the steam generator around the tube bundle during operation. The primary water which flows and collects heat from a heat source, such as a nuclear reactor, transfers the heat through the walls of the tubes 21 to the secondary water which is thereby generated into steam. Having flowed through the nuclear reactor, the primary water could be contaminated with radiation and it is therefore necessary that any such contaminaton be contained on the primary side of the system, and not be allowed to pass through any tube 21 to the secondary side. Although the level of such radio-activity in the primary water may be low, any significant leakage of this water into the secondary water system is not acceptable, and requires shutdown of the nuclear power plant.

Figure 3:
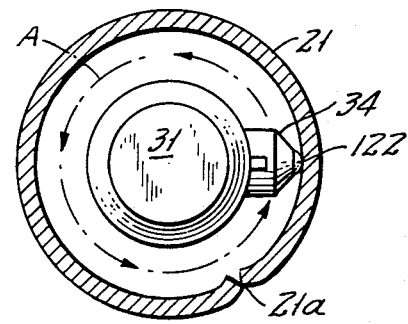
FIG. 3 is a cross-sectional view as seen from line 3—3 in FIG. 2.

Such leakage through any tube 21 probably would be the result of corrosion cracking of the tube, as at 21a (FIG. 3), which occurs as a result of the buildup of corrosion products 25 between any tube 21 and either the tube supports 24 or the tube plates 23. Such buildup occurs due to small differences between the temperature of the bulk water surrounding the tubes and tube support plates within the shell, and that of the water/steam in the annuli between the tubes and the drilled holes in the support plates through which the tubes pass, which results in deposit within the annuli of impurities from the bulk water. Corrosion of the drilled hole surfaces in the steel support plates is accelerated and, since the corrosion products are more voluminous than the steel from which they are generated, the tubes become distorted or "dented" as indicated in FIG. 2. As tube distortion increases, a variety of tube shapes develop and, as the strain in the tube wall increases, the tube becomes increasingly susceptible to stress corrosion cracking and, ultimately, complete rupture.

Referring again to FIG. 1, the rotating head, eddy current probe 20 is mounted on the end of a stiff but flexible wire carrying tubing, hereinafter referred to as a wire cable 26 by which it is pushed and pulled through the tube 21 whose profile is to be determined. The cable 26 has electric wires therein, as diagramatically indicated by reference numeral 27. The electric wires are connected to a computer and/or recording apparatus, which is only diagramatically indicated by reference 28. The electro-mechanical operation of the probe 20 is powered by an exterior electrical source (not shown), which may be within the computer/recorder 28, in which the electro-mechanical output from the probe 20 is recorded or utilized. The flexible cable 26 is, of course, longer than the length of any tube 21.

For greater accuracy, readings are taken from the eddy current probe only as it is pulled from the opposite end of the tube 21 back towards the open end through which it was initially inserted. Steady tension and pulling movement on the cable 26 is controlled by a D.C. stepping motor (not shown) which drives a pair of tension drive rolls 29a, 29b, between which the cable 26 is passed.

The eddy current probe 20 is made of non-magnetic material, preferably stainless steel, and has a main body part 30, to an end 30a of which the flexible cable 26 is attached, as by a cable coupling 26a. The main body 30 mounts an axially rotatable head 31 on its opposite, free end 30b, and a stationary eddy current locator coil 32 at a location near the free end 30b as shown, for reasons as will be explained. In addition, the main body 30 carries a pair of spaced-apart resilient, slide type centering guides 33a, 33b respectively adjacent to its ends 30a, 30b, as shown. The centering guides 33a, 33b are stationary on the body 30. The rotatable head 31 mounts a transverse, laterally projecting, deflectable sensing member 34, for a purpose as will be described. As illustrated by the arrows A in FIGS. 2 and 3, when the probe 20 is within any tube 21 its rotatable head 31 is centered within the tube and the sensing member 34 slides in contact with the interior surface of the tube and moves in a spiral pattern to sense its profile, as the rotatable head 31 is rotated and the probe 20 is drawn through the tube 21 in longitudinal direction as indicated by the arrow B in FIG. 2.

Referring now to FIG. 4, rotation of the rotatable head 31 having a tapered portion 31b, is effected and maintained at a constant rate by a gear motor generally indicated at 35, which has a rotatable output shaft 35a attached, as by set screw 36, to a lower end 31a of the rotatable head 31. The gear motor 35 is mounted within the main body 30, and has electrical leads 37, which pass through an appropriate channel 38 to be coupled to the electric wiring 27 (FIG. 1).

Figure 5:
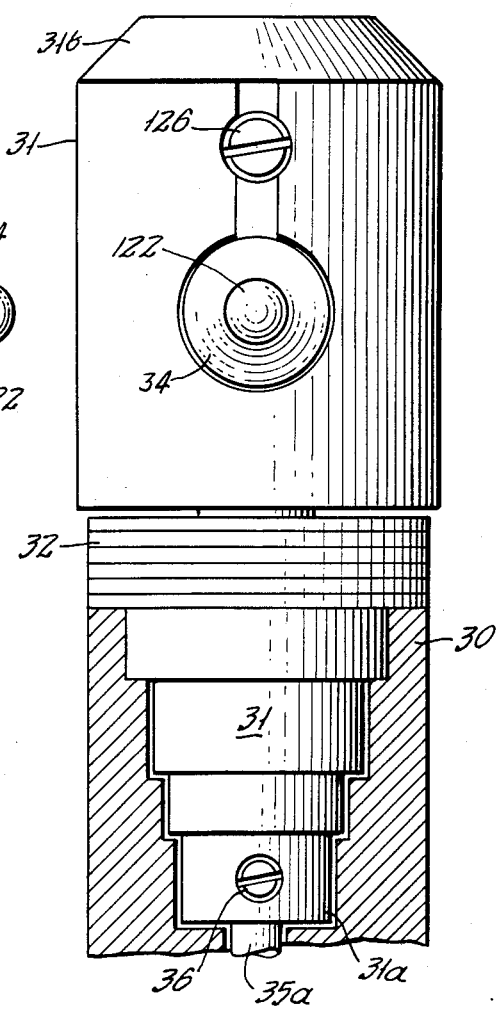
FIG. 5 is a fragmentary sectional front view of only a part of the FIG. 4 showing.

Referring to FIGS. 4 and 5, rotating head 31 carries a transversely slidable sensing member 34, which has a sapphire jeweled end 122 for sliding contact with the interior wall surface of any tube or conduit whose profile is to be determined. The slidable sensing member 34 is urged by a coil spring 123 in the radially outward direction, its movement being guided on the fixed pin 124, which rests on the inner surface 125a of the slide slot 125 formed in the rotatable head 31. Sensing member 34 has a projecting portion 121a, which, by its abutment with a set screw type stop 126, prevents the sensing member 34 from disengaging from the slot 125 in response to the bias of the spring 123.

A cylindrical eddy current coil 127 which is disposed about and set into the sensing member 34, is energized by electrical wires 128 which make contact, through contacts 129, with slip-rings 130 which, in turn, are connected to the wiring 27 in the wire cable 26 (FIG. 1) via electrical wiring 37a within the wire slot 38 of the probe main body 30. Since the jewel 122 is urged continuously into contact with the interior wall surface of the conduit or tube 21, the eddy current coil 127 is always located at a fixed distance away from the wall surface. Thus, as the head 31 is rotated and the probe and, thus, the eddy current coil are moved steadily through an undented length of the tube, or a length along which the tube wall thickness is uniform, there is no change in the electrical condition of the coil 127. However, as the probe approaches a dented tube portion, or a tube portion having a changed wall thickness, or a local defect, a change will be induced in the flow of electric current through the coil 127. This change is sensed at the recorder/computer 28 (FIG. 1) and, thus, any change in wall thickness or any local defect is detected.

Referring again to FIGS. 1 and 2, it will be understood that the probe body is centered within any tube 21 as it is moved therethrough, by the pair of centering guides 33a, 33b. Each of the guide members 33a or 33b is cylindrical, flower-shaped arrangement of a plurality of outward tapering leaf springs 113 which are equally spaced about the periphery of the probe. The guide units are press fit or otherwise attached to the body in spaced-apart relation to each other, at opposite ends of the probe body, the guide unit 33b being adjacent to the rotating head, and the guide unit 33a being positioned near the cable coupling 26a. Thus, the probe is stabilized as it passes through any tube 21 to prevent its pitching or yawing, and thus maintain the accuracy of its positioning with respect to the interior wall of the tube. In the illustrated embodiment of the centering guide 33a, 33b, the leaf springs 113 are attached to the probe body at one of their ends, and their opposite outwardly projecting ends 113a are free. The ends 113a have inwardly bent tips, as shown, for smoothness of their longitudinal sliding movement through the tube. These finger members 113 are moderately flexible, and will flex individually as tube indentations are encountered. They are made of non-magnetic spring steel material, so as not to interfere with the electro-magnetic operation of the probe, as will be understood.

As seen in FIG. 2, the eddy current locator coil 32 is attached at a location along the length of the main body 30 of the probe, close to its rotating head 31, and consists of a wire coiled about the body, as is well known. The coil 32 has electrical leads within the main body 30 but not visible in the drawings, which also connect to appropriate continuation wires within the wire cable 26.

The probe main body 30, the rotatable head 31, including its sensing member 34, and the wire cable 26, as well as the coupling 26a, are all made of non-magnetic material. For example, the probe body and its rotatable head are preferably made of stainless steel, but could be made of suitable plastic, if otherwise appropriate. The centering guides 33a, 33b, may be made of non-magnetic spring steel as previously mentioned, or of aluminum, or possibly of plastic if appropriate. Similarly, the wire cable 26 may be rubber or plastic coated wire.

The manner of use of the eddy current probe 20 will now be described with reference to FIGS. 1 and 2, in which it is used to sense the interior profile of any of the steam generator tubes 21 as more fully described in said application Ser. No. 306,175. In this regard, it will be understood that the tubes 21 have inverted U-shape, and may extend some 40 feet upwardly to the top of the steam generator and downwardly to an opposite open end again at the bottom of the steam generator, at the tube plate 23. Tubes 21 are each about seven-eighths of an inch in diameter and, therefore, the diameter of the main body 30 of the probe as well as that of the rotatable head 31, is somewhat less, e.g., about one-half an inch. The diameter of the outwardly projecting, centering guide fingers 113 is, of course, about one inch so that they will somewhat stiffly engage the tube interior wall. The overall length of the probe is about 7½ inches or less, which permits it to follow around the bend of the U-shape at the tops of all but the sharpest curved U-tubes.

Referring to FIG. 1, the probe is positioned beneath the open end of a tube 21 as shown, and is introduced into the tube and fed upwardly therethrough, continuing around the top of the inverted U-shape and thereafter to the bottom of the tube at its opposite open end, a distance of perhaps more than 80 feet. Alternatively, the probe may be introduced into the tube and fed upwardly therethrough to some predetermined position in the tube less than its full length. The probe and its wire cable 26 are fed into and through the tube 21 by driving the drive rolls 29a, 29b. The rolls 29a, 29b are driven by a D.C. stepping motor (not shown), for convenience in changing the speed of the rolls. The rotatable head 31 need not be rotating, nor need the sensing elements of the probe be energized, at this time.

After the probe is fully inserted within the tube to its opposite end, the probe is activated by energizing the eddy current coil 32 in body member 30 and the eddy current coil 127 in its sensing member 34. In addition, the gear motor 35 is started, to cause the rotatable head 31 to rotate at a constant speed of about one revolution per second. The direction of rotation of the drive rolls 29a, 29b is then reversed, so that the wire cable 26 and probe 20 are withdrawn from the tube 21, during which time the readings from the probe are taken. The pulling speed of travel of the probe within the tube is varied between a relatively fast rate of about one foot per-second along the tube lengths which are intermediate the tube support plates 24, and a relatively slow rate of about one-eighth of an inch (⅛") per second, or momentarily stopped if desired, adjacent to each location of a tube support plate 24, the latter being the locations of interest where the tube denting, local defects and changes in tube thickness are most likely to occur. The eddy current locator coil 32, located close to, but still in advance of the rotating sensing head 31, senses and locates each tube support plate 24 in advance of the arrival of the sensing head 31, so that the rate of travel of the probe can be reduced or stopped to take more readings at each of these locations. As the eddy current locator coil 32 moves beyond the denting location and signals that it is now moving along an intermediate length of the tube, the speed of the drive rolls 29a, 29b, can be increased so that relatively few or no revolutions of the rotating head 31 take place during the probe travel in these regions.

As the rotating head 31 of probe 20 is drawn steadily outward from the tube 21, the jeweled tip 122 of its revolving sensing member 34 is urged against the interior wall surface of the tube, keeping eddy current coil 127 a constant distance from the inner surface of the wall of tube 21. The thickness of the wall of tube 21 is thus continually measured, recorded and may be displayed in graphic form by the computer/recorder 28. The display will also be correlated with the tube support plate locations, as aforesaid.

Of course, further modifications of the construction and/or arrangement of the probe are contemplated in accordance with the invention. For example, and although not illustrated, the eddy current locator coil 32 (FIGS. 1 and 2) might be disposed at a middle location along the length of the probe main body 30, between the centering guides 33a, 33b, instead of immediately adjacent to the rotatable head 31 as illustrated.

Another arrangement might be to mount the drive motor 35 within the rotatable head 31 itself, with appropriate connection of its then inverted drive shaft 35a to the main body 30, and including a suitable bearing arrangement. Such might provide greater compactness of the probe, shortening its length and enabling it to pass through more sharply curved lengths of tubing or conduit.

It will also be understood that the probe may be made considerably larger in diameter, or its laterally projecting sensing member might be made much longer, to adapt the probe to pass through and similarly inspect the interior wall surfaces of much larger conduit, such as 10" or 12" diameter pipe conduit. Alternatively, it might be made smaller than the described embodiment, to adapt it appropriately for other uses.

Thus has been described a rotating head eddy current probe in a preferred embodiment, and the manner of its use, which achieves all of the objects of the invention.

What is claimed is:

1. Tube inspection apparatus comprising an eddy current probe adapted for insertion into a tube or the like to sense the thickness of and local defects in the wall of the tube, said tube being mounted in a plurality of supports spaced from each other longitudinally of the tube, said probe comprising a main body having a longitudinal axis, a rotatable head mounted on said main body for rotation about its said longitudinal axis, drive means in said probe and connected to said rotatable head for rotating its said rotatable head, an outwardly projecting sensing member mounted for radial inward and outward movement on said rotating head and having an outer end for contacting said tube interior wall surface, means biasing said sensing member in the outward direction of said probe, a first eddy current coil mounted on said sensing member responsive to movement of said sensing member to generate first signals corresponding to a defect in said wall, a second eddy current coil mounted on said main body and spaced longitudinally away from said sensing member for generating second signals corresponding to the locations of said supports as said probe is pulled through said tube and variable speed drive means connected to said probe for pulling said probe through said tube at two different rates dependent upon the location of said second eddy current coil, with respect to said supports, one of said rates being relatively fast with said sensing member intermediate said supports and the other of said rates being relatively slow with said sensing member adjacent a support.

2. An eddy current probe according to claim 1 wherein said sensing member is mounted for linear slidable movement on said rotatable head.

3. An eddy current probe according to either of claims 1 and 2, which further comprises centering guide means mounted thereon for maintaining said main body longitudinal axis substantially centered within said tube.

4. An eddy current probe according to claim 3 wherein said centering guide means comprises a plurality of radially outward projecting and peripherally spaced apart resilient slide means on said main body.

5. An eddy current probe according to cliam 4 wherein said centering guide means comprises a second plurality of radially outward projecting and peripherally spaced apart resilient slide means on said main body in longitudinally spaced relation with respect to the first said resilient slide means.

6. An eddy current probe according to claim 1, wherein said probe has a free end comprising said rotatable head and an opposite end comprising said main body, said main body further having means therein extending from said eddy current coil on said sensing means and from said eddy current locator coil mounted on said main body to said opposite end of the probe, said second eddy current coil on said main body being located between said rotatable head and said opposite end of the probe.

7. Tube inspection apparatus comprising a probe adapted for insertion into a tube or the like to sense local defects in the wall of the tube, said tube being mounted in a plurality of supports spaced from each other longitudinally of the tube, said probe comprising a main body havng a longitudinal axis, a rotatable head mounted on said main body for rotation about its said longitudinal axis, drive means on said probe and connected to said rotatable head for rotating its said rotatable head, an outwardly projecting sensing member mounted for radial inward and outward movement on said rotating head and having an outer end for contacting said tube interior wall surface during rotation of said rotatable head, means biasing said sensing member in the outward direction of said probe, means connected to said sensing member and responsive to movement of said sensing member for generating first electrical signals dependent upon a physical characteristic of the portion of said tube wall surface engaged by the sensing member, and eddy current coil mounted on said main body and spaced from said sensing member for generating second electrical signals corresponding to the locations of said support probe as said probe is pulled through said tube and variable speed drive means connected to said probe for pulling said probe through said tube at two different rates dependent upon the location of said eddy current coil with respect to said supports, one of said rates being relatively fast with said sensing member intermediate said supports and the other of said rates being relatively slow with said sensing member adjacent a support.

8. A probe as set forth in claim 7 wherein said means connected to said sensing member for providing an electrical signal comprises electrical means responsive to said physical characteristic for providing said first electrical signal which varies with variations of said physical characteristic.

9. A probe as set forth in claim 8 wherein said electrical means comprises an eddy current coil.

10. A probe as set forth in claim 7 further comprising centering means mounted on said main body for maintaining said longitudinal axis of said main body substantially centered within said tube as said probe is moved axially of said tube.

* * * * *